United States Patent
Gordon et al.

(10) Patent No.: US 9,544,310 B2
(45) Date of Patent: Jan. 10, 2017

(54) DISCOVERING AND DISAMBIGUATING IDENTITY PROVIDERS

(71) Applicant: MICROSOFT TECHNOLOGY LICENSING, LLC, Redmond, WA (US)

(72) Inventors: Ariel Gordon, Redmond, WA (US); Sam Franklin Williams, III, Redmond, WA (US); Sarat Chandra Subramaniam, Redmond, WA (US); William Louis Thomas, Redmond, WA (US); Michael Robert Van Waardhuizen, Redmond, WA (US); Jonathan Yoder Brenner, Seattle, WA (US); Tia Bianca Caldwell, Redmond, WA (US); Eric Wayne Doerr, Redmond, WA (US); Amy Caryl Nathanson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/164,990

(22) Filed: Jan. 27, 2014

(65) Prior Publication Data

US 2015/0215315 A1    Jul. 30, 2015

(51) Int. Cl.
*H04L 29/06*    (2006.01)
*G06F 21/31*    (2013.01)

(52) U.S. Cl.
CPC ........... *H04L 63/0884* (2013.01); *G06F 21/31* (2013.01)

(58) Field of Classification Search
None
See application file for complete search history.

(56) References Cited

U.S. PATENT DOCUMENTS 8,037,194 B2    10/2011    Yared et al.
2006/0218625 A1*    9/2006    Pearson et al. .................. 726/4
(Continued)

FOREIGN PATENT DOCUMENTS

WO    2013116319 A1    8/2013

OTHER PUBLICATIONS

Scavo et al., Shibboleth Architecture, 2005.*
(Continued)

*Primary Examiner* — Minh Dinh
(74) *Attorney, Agent, or Firm* — Timothy Churna; Kate Drakos; Micky Minhas

(57) ABSTRACT

Systems, methods, and computer-readable storage media are provided for discovering and disambiguating identity providers such that user knowledge of appropriate identity providers is minimized. Users are presented with options for selecting appropriate providers only when multiple providers have user profiles matching a user identifier. When users are presented with options for selecting appropriate providers, providers that have user profiles matching the identifier are identified utilizing identity information for the application that utilizes the identity provider for its users rather than information identifying the identity provider itself. Where it is determined that no identity provider has a user profile associated with the user identifier (or where it is determined that a particular identity provider would generally be appropriate to be utilized with the user identifier), the opportunity for users to create an authentication account with one or more identity providers or to retry with a different user identifier is provided.

33 Claims, 10 Drawing Sheets

(56) References Cited

U.S. PATENT DOCUMENTS

| | | | |
|---|---|---|---|
| 2012/0144034 A1* | 6/2012 | McCarty | 709/225 |
| 2012/0227098 A1 | 9/2012 | Obasanjo et al. | |
| 2012/0260092 A1 | 10/2012 | Girao et al. | |
| 2013/0179573 A1 | 7/2013 | McCarty | |
| 2013/0198823 A1 | 8/2013 | Hitchcock et al. | |
| 2013/0205360 A1 | 8/2013 | Novak et al. | |
| 2013/0227140 A1* | 8/2013 | Hinton et al. | 709/225 |
| 2014/0189123 A1* | 7/2014 | Dodd et al. | 709/226 |

OTHER PUBLICATIONS

Reed et al., OpenID Identity Discovery with XRI and XRDS, ACM, 2008.*

Identity Provider Discovery Service Protocol and Profile, OASIS, 2008.*

Nagelberg, Federated Identity Management—Identity Federation Concepts White Paper, CSC, 2010.*

Hockings et al., Enable bring-your-own-identity authentication, IBM, Oct. 2013.*

"Ping Identity Enterprise Solutions", Published on: Dec. 17, 2013 Available at: https://www.pingidentity.com/unprotected/loader.cfm?csModule=security/getfile&pageid=63244.

"What is the global-authentication-api?", Retrieved on: Dec. 10, 2013 Available at: http://code.google.com/p/global-authentication-api/.

"Cloud Identity Connectors", Published on: Sep. 10, 2011 Available at: https://www.pingidentity.com/our-solutions/sso-cloud-identity.cfm.

Fulton, Scott M., "It's PingFederate 6.6 Versus Identity as a Service", Published on: Feb. 14, 2012 Available at: http://readwrite.com/2012102/14/its-pingfederate-66-versus-ide#awesnn=~opGi5jyboULGms.

"SAP NetWeaver Identity Management Identity Provider", Published on: Jul. 23, 2012, Available at: http://help.sap.com/download/documentation/sapnetweaver_identitymanagennent_identityprovider.pdf.

Blount, et al. "CA Technologies Strategy and Vision for Cloud Identity and Access Management", In White Papers of Cloud Identity and Access Management, Feb. 2013, 15 pages.

* cited by examiner

Create an Organizational Account?

810 — bob@contoso.com
812 — Please Create a Password
☐ Keep me signed in
814 — Create      Back — 816

DISCOVERING AND DISAMBIGUATING IDENTITY PROVIDERS

BACKGROUND

"Identity providers" are systems that create, maintain and manage identity information for users, systems, and/or services and provide authentication of such users, systems and/or services to other service providers (e.g., applications). In the simplest case, a user has one digital identity for one application or website (e.g., users may log into Facebook® using their Facebook® identity or log into Yahoo® using their Yahoo® identity). However, many services operate within a federation or distributed network, where such services trust an external identity providers (often an otherwise unaffiliated party) that users and servers rely upon when establishing a dialog for authentication. Further, many websites and applications permit use with digital identities from multiple identity providers. Thus, it is necessary for applications to discover which identity provider end-users want to use.

In the consumer space, typical practice is to display a list of names, pictograms or user-selectable buttons, each button representing an identity provider. For instance, the buttons may read "Sign in with Facebook®," Sign in with Google®," and the like, wherein Facebook® and Google® represent different identity providers. This type of experience is often confusing for users and may hurt the destination site or application's brand equity, as the user interface becomes crowded with logos from different, and often competing, providers.

In the organizational space (e.g., enterprises, schools, etc.), online service providers typically set up addresses that are specific to each organization. For example, employees of the Contoso organization may visit http://contoso.some-calendar-app.com to access an online calendaring application tailored to Contoso users. An alternative is for service providers to set up a shared landing page on which end-users are prompted to enter their organizational email address as a user identifier. The website or application then places one or more Application Programming Interface (API) calls to determine the appropriate identity provider based on the domain of the email address entered. The application then redirects the user to the proper identity provider for authentication.

While this approach works well in fairly constrained environments, such as enterprise applications exposed only to internal users and users from a select number of partner organizations (e.g., vendors), the approach becomes more complex when these organizational services operate in the cloud with an "open" model, where there is no preconceived knowledge of the appropriate identity provider. For one thing, there is no universal identity provider discovery API on the Internet that would allow a website to determine the appropriate identity provider based on an email address. Furthermore, the pictogram or selectable list of identity provider options approach is not ideal as end users are often unaware of the name of the provider that manages their organization identity (for instance, a Contoso employee may not know that Contoso's IT department has chosen Identity Provider "A" to manage their employees identities and thus would not be able to select the proper button from a list that includes multiple enterprise identity providers).

This problem becomes even more complex to solve for websites that cater to both organizational and personal identities as the same email address may be used by someone as a sign-in identifier for many different online identities. For example, a user named Kelly might use her work email address, kelly@contoso.com, as a sign in string for her Facebook®, Google®, Amazon®, and Microsoft® accounts, each being associated, however, with differing further authentication credentials (e.g., passwords). When presented with an authentication option, Kelly might be quite familiar with her employee email address that she utilizes on a daily basis but she may not remember which of her accounts having this email address as a digital identifier she utilized in creating an account for another website or service. Further, it becomes difficult, if not impossible, to disambiguate Kelly's digital identity based on the email address alone in such situations using traditional approaches.

As a result, many websites and applications have simply renounced offering an integrated Identity Discovery experience. Some organizational services have chosen to display a collection of user-selectable options that confuse end-users as they don't know which option to select. Other organizational services have simply set up different entry points (e.g., website addresses) for different organizations. For instance, if Contoso uses Box.com®, a provider of cloud-hosted file servers that caters to organizations, to manage its employees' files, employees of Contoso are often unable to sign into BOX® from the website's homepage, www.box.com, and must instead use a dedicated URL like https://contoso.box-.com/login) for authentication. This is cumbersome to say the least.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for discovering and disambiguating identity providers in such a way that necessary user knowledge pertaining to appropriate identity providers is minimized, if not eliminated, as users are presented with options for selecting appropriate providers only when multiple providers have user profiles that match a particular user identifier. Further, when users are presented with options for selecting appropriate providers, various providers that have a user profile that matches a particular user identifier are presented to the user utilizing identity information pertaining to the organization that utilizes a particular identity provider for its users rather than exclusively by identifying information for the identity provider—which the user may not even be aware is performing the identity management for the organization owning their user identifier. Still further, where it is determined that no identity provider has a user profile associated with a particular user identifier (or where it is determined that an identity provider that does not have a user profile associated with a particular user identifier would generally be appropriate to be utilized with the user identifier, for instance, based upon an Internet domain associated with the user identifier), systems and methods hereof provide the opportunity for users to create an account with one or more identity providers or to retry with a different user identifier.

Not only do the systems and methods described herein streamline identity provider discovery and disambiguation processes for organizational services that operate in the cloud and/or cater to both organizational and personal identities, such systems and methods are less confusing and cumbersome for end-users attempting to access various online applications and services.

BRIEF DESCRIPTION OF THE DRAWINGS

The present invention is illustrated by way of example and not limitation in the accompanying figures in which like reference numerals indicate similar elements and in which:

FIG. 8 is an exemplary screen display of an account creation user interface, in accordance with an embodiment of the present invention;

DETAILED DESCRIPTION

Figure 1:
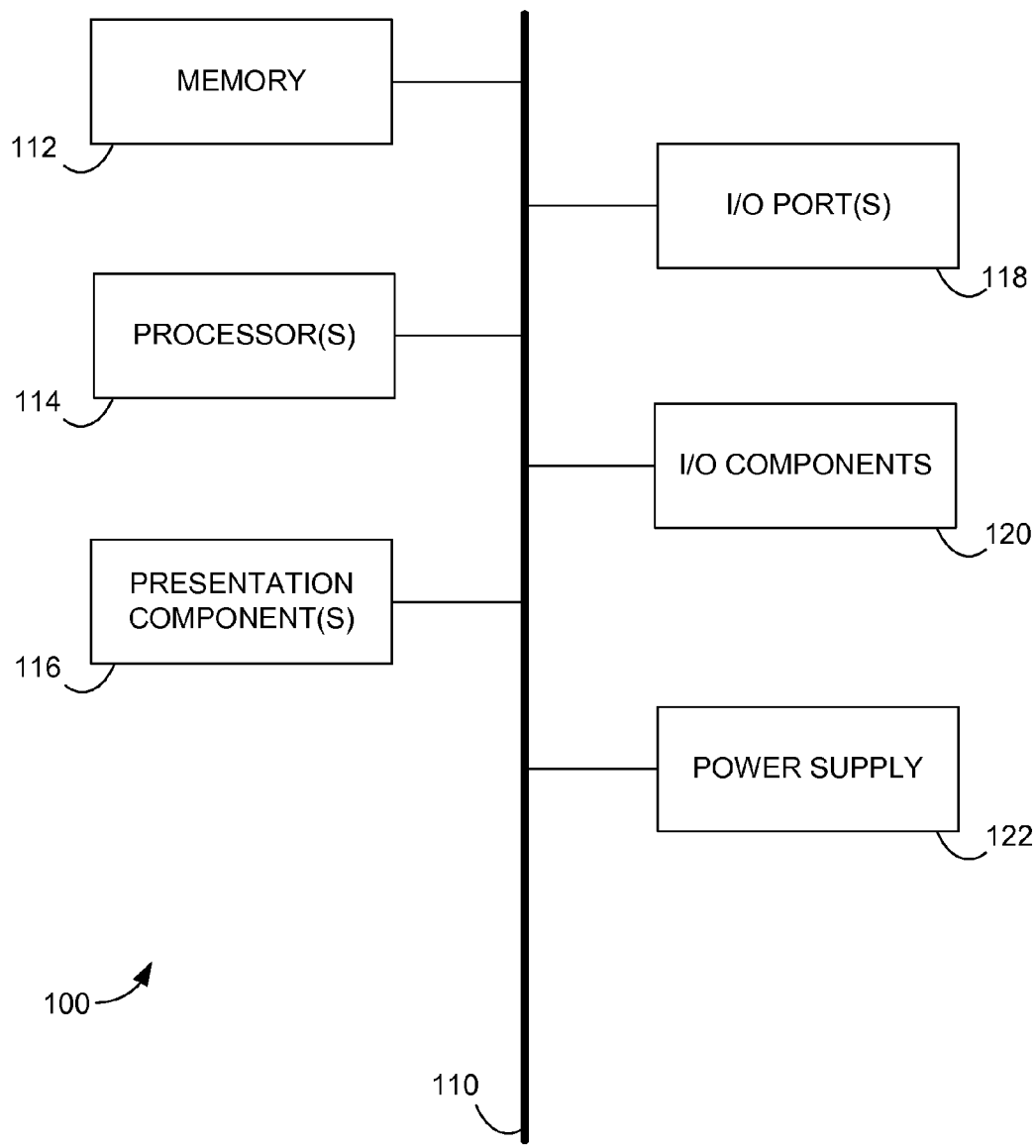
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for discovering and disambiguating identity providers in such a way that user knowledge pertaining to appropriate identity providers is minimized as users are presented with options for selecting appropriate providers only when multiple providers have user profiles that match a particular user identifier. Further, when users are presented with options for selecting the appropriate provider, various providers that have a user profile that matches a particular user identifier are presented to the user utilizing identity information pertaining to the organization that utilizes a particular identity provider for its users rather than merely by identifying information for the identity provider. Still further, where it is determined that no identity provider has a user profile associated with a particular user identifier (or where it is determined that an identity provider that does not have a user profile associated with a particular user identifier would generally be appropriate to be utilized with the user identifier), systems and methods described herein provide the opportunity for users to create an account with one or more identity providers or to retry with a different user identifier.

Accordingly, in one aspect, embodiments of the present invention are directed to one or more computer-readable storage media storing computer-useable instructions that, when used by one or more computing devices, cause the one or more computing devices to perform a method for discovering and disambiguating identity providers. The method includes receiving a single user identifier (e.g., an email address, a user name, a telephone number, or next generation credentials such as a USB key or a user agent built into an operating system, which may contain multiple identities or identifiers) and placing one or more Application Programming Interface (API) calls to perform discovery on the user identifier against a plurality of identity providers to determine if any of the identity providers have an identity profile that matches the user identifier.

If it is determined that a single identity provider of the plurality has a user profile that matches the user identifier, the method further comprises providing instructions for redirecting the user to the single identity provider for authentication. In embodiments, upon redirection, the user may be prompted to input what he or she thinks of as additional authentication credentials associated with the single user identifier. For instance, if the received user identifier is an email address from a Contoso employee by the name of Kelly, e.g., kelly@contoso.com, upon redirection, Kelly may be prompted to input a password associated with her Contoso account (e.g., her Contoso organizational password). In embodiments where Contoso has elected to have an external identity provider manage its employees' identifiers, Kelly may be completely unaware of the company's election as the additional authentication input display may appear identical or similar to Kelly's standard Contoso sign-in display, identifying only the Contoso organization (e.g., by the organization's name and/or logo) and not identifying information associated with the identity provider. In other embodiments, identifying information associated with both the Contoso organization and the identity provider may be displayed. Any and all such variations, and any combination thereof, are contemplated to be within the scope of embodiments hereof.

If instead of a single identity provider it is determined that multiple identity providers of the plurality have user profiles that match the user identifier, the method further comprises providing instructions for rendering a first disambiguation user interface. In embodiments, instructions are provided for rendering the first disambiguation user interface to include identifying information corresponding only to those identity providers that are determined to have a user profile that matches the user identifier. That is, identifying information for any identity provider of the plurality that does not have a user profile matching the received user identifier may not be rendered in association with the first disambiguation user interface. If one or more of the multiple identity providers determined to have a user profile that matches the user identifier is determined to be an organization owning the user identifier, the provided instructions may instruct the application to render identifying information for the organization (e.g., the organization's name and/or logo) instead of, or in addition to, the identity provider itself to improve the ease with which the user may be able to correctly determine the desired identity provider. In embodiments, identifying information associated with each of the identity providers includes a selectable button for permitting the user to select the desired provider.

If upon placing the one or more API calls to perform discovery on the user identifier against the plurality of identity providers, at least one of the API calls times out or returns unexpected, invalid, or throttled results, the method may further comprise providing instructions for rendering a second disambiguation user interface. In embodiments, the second disambiguation user interface may include names, pictograms and/or user-selectable buttons, each button representing an identity provider, such that the user may be permitted to aid in selection of the desired identity provider.

If upon placing the one or more API calls to perform discovery on the user identifier against the plurality of identity providers it is determined that no identity providers of the plurality have a user profile that matches the user identifier, the method may further comprise providing instructions for rendering an account creation user interface to allow the user to create an identity profile with one or more identity providers. In embodiments, instructions may be provided for rendering an account creation user interface that allows for the user to create an identity profile with one or more of the plurality of identity providers that is determined to be most appropriate for the user identifier. For instance, heuristics may be utilized to determine whether the user identifier is likely company issued or personal. Instructions may then be provided for routing the user to one of an organizational account creation user interface or a personal account creation user interface. In embodiments, instructions may be provided for rendering account creation options in conjunction with identifying information for identity providers determined to have user profiles matching the user identifier as well.

In another aspect, embodiments of the present invention are directed to a method being performed by one or more computing devices including at least one processor, the method for discovering and disambiguating identity providers. The method includes receiving a single user identifier (e.g., an email address, a user name, a telephone number, or next generation credentials such as a USB key or a user agent built into an operating system, which may contain multiple identities or identifiers). In embodiments, the method may include prompting the user for input of the user identifier. In other embodiments, the method may include receiving a call from an external application that includes the user identifier. For instance, presume an invitation to view a particular file is received by a user in an email account associated with a particular email address. Upon the user selecting to view the particular file, the email address may be pre-populated as a user identifier to streamline authenticating the user for viewing the file. Such would by-pass the need for the user to even input a user identifier. Any and all such variations, and any combination thereof, are contemplated to be within the scope of embodiments of the present invention.

Upon receipt of a user identifier, the method further includes placing one or more API calls to perform discovery on the user identifier against a plurality of identity providers to determine if any of the identity providers have an identity profile that matches the user identifier. In embodiments, multiple API calls may be placed by the application in parallel, synchronously or asynchronously, and the responses from each call aggregated. The application may then determine if there are any identity providers of the plurality that have user profiles that match the user identifier. In other embodiments, a single API call may be placed and a single response may be received that includes information aggregated from the plurality of identity providers.

If it is determined that a single identity provider of the plurality of identity providers has authentication information associated with the user identifier, the method may include redirecting the user for authentication against the single identity provider. In embodiments, after redirection, the user may be prompted to input what he or she thinks of as additional authentication credentials associated with the single user identifier. For instance, if the received user identifier is an email address from a Contoso employee by the name of Kelly, e.g., kelly@contoso.com, after redirection, Kelly may be prompted to input a password associated with her Contoso account (e.g., her Contoso organizational password). In embodiments where Contoso has elected to have an external identity provider manage its employees' identifiers, Kelly may be completely unaware of the company's election as the additional authentication input display may appear identical or similar to Kelly's standard Contoso sign-in display, identifying only the Contoso organization and not identifying information associated with the identity provider. In other embodiments, identifying information associated with both the Contoso organization and the identity provider may be displayed. Any and all such variations, and any combination thereof, are contemplated to be within the scope of embodiments hereof.

If instead it is determined that multiple identity providers of the plurality of identity providers have authentication information associated with the user identifier, the method may further include rendering a first disambiguation user interface. In embodiments, the first disambiguation user interface may include identifying information corresponding only to those identity providers that are determined to have a user profile that matches the user identifier. That is, identifying information for any identity provider of the plurality that does not have a user profile matching the received user identifier may not be rendered in association with the first disambiguation user interface. If one or more of the multiple identity providers determined to have a user profile that matches the user identifier is determined to be an organization owning the user identifier, the application may render identifying information for the organization (e.g., the organization's name and/or logo) instead of, or in addition to, the identity provider itself to improve the ease with which the user may be able to correctly determine the desired identity provider. In embodiments, identifying information associated with each of the identity providers includes a selectable button for permitting the user to select the desired provider.

If upon placing the one or more API calls to perform discovery on the user identifier against the plurality of identity providers, at least one of the API calls times out or returns unexpected, invalid, or throttled results, the method further comprises rendering a second disambiguation user interface. In embodiments, the second disambiguation user interface may include names, pictograms and/or user-selectable buttons, each button representing an identity provider, such that the user may be permitted to aid in selection of the desired identity provider.

If upon placing the one or more API calls to perform discovery on the user identifier against the plurality of identity providers it is determined that no identity providers of the plurality has a user profile that matches the user identifier, the method further comprises rendering an account creation user interface to allow the user to create an identity profile with one or more identity providers. In embodiments, the account creation user interface may allow the user to create an identity profile with one or more of the plurality of identity providers that is determined to be most appropriate for the user identifier. For instance, heuristics may be utilized to determine whether the user identifier is likely company issued or personal. The user may then be routed to one of an organizational account creation user interface or a personal account creation user interface, whichever is more appropriate. In embodiments, account creation options may be rendered in conjunction with identifying information for identity providers determined to have user profiles matching the user identifier as well.

In yet another aspect, the present invention is directed to one or more computer-readable storage media storing computer-useable instructions that, when used by one or more computing devices, cause the one or more computing devices to perform a method for discovering and disambiguating identity providers. The method includes receiving a request for access to an application or service for which authentication is required and providing a first user interface that allows for selection from a first plurality of identity providers or identity provider types for authenticating to the application or service. In embodiments, the first user interface may further allow for user selection of an option for seeking assistance in selecting one of the first plurality of identity providers or identity provider types. In embodiments, the method further includes receiving a selection of the option for seeking assistance in selecting one of the first plurality of identity providers or identity provider types and providing a second user interface prompting for input of a single user identifier (e.g., an email address, a user name, a telephone number, or next generation credentials such as a USB key or a user agent built into an operating system, which may contain multiple identities or identifiers).

The method further includes placing one or more API calls to perform discovery on the user identifier against a plurality of identity providers to determine if any of the identity providers has an identity profile that matches the user identifier. If it is determined that a single identity provider of the second plurality of identity providers has authentication information associated with the user identifier, the method further includes redirecting the user for authentication against the single identity provider. If it is determined that multiple identity providers of the second plurality of identity providers have authentication information associated with the user identifier, the method further includes rendering a first disambiguation user interface, the first disambiguation interface having characteristics such as those described above. If, however, upon placing the one or more API calls to perform discovery on the user identifier against the plurality of identity providers to determine if any of the identity providers has an identity profile that matches the user identifier at least one of the one or more API calls times out or returns unexpected, invalid, or throttled results, the method includes rendering a second disambiguation user interface, the second disambiguation interface having characteristics such as those described above. If upon placing one or more API calls to perform discovery on the user identifier against the plurality of identity providers to determine if any of the identity providers has an identity profile that matches the user identifier it is determined that no identity provider of the second plurality of identity providers has authentication information associated with the user identifier, the method further includes rendering an account creation user interface to allow the user to create an identity profile with one or more identity providers or retry with a different user identifier.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the present invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention also may be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as authentication requests, identity provider selections, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

As previously set forth, embodiments of the present invention provide systems, methods, and computer-readable storage media for discovering and disambiguating identity providers in such a way that user knowledge pertaining to appropriate identity providers is minimized as users are presented with options for selecting appropriate providers only when multiple providers have user profiles that match a particular user identifier. Further, when users are presented with options for selecting an appropriate provides, various providers that have a user profile that matches a particular user identifier are presented to the user utilizing identity information pertaining to the organization that utilizes a particular identity provider for its users rather than merely by identifying information for the identity provider. Still further, where it is determined that no identity provider has a user profile associated with a particular user identifier (or where it is determined that an identity provider that does not have a user profile associated with a particular user identifier would generally be appropriate to be utilized with the user identifier), systems and methods described herein provide the opportunity for users to create an account with one or more identity providers.

Figure 2:
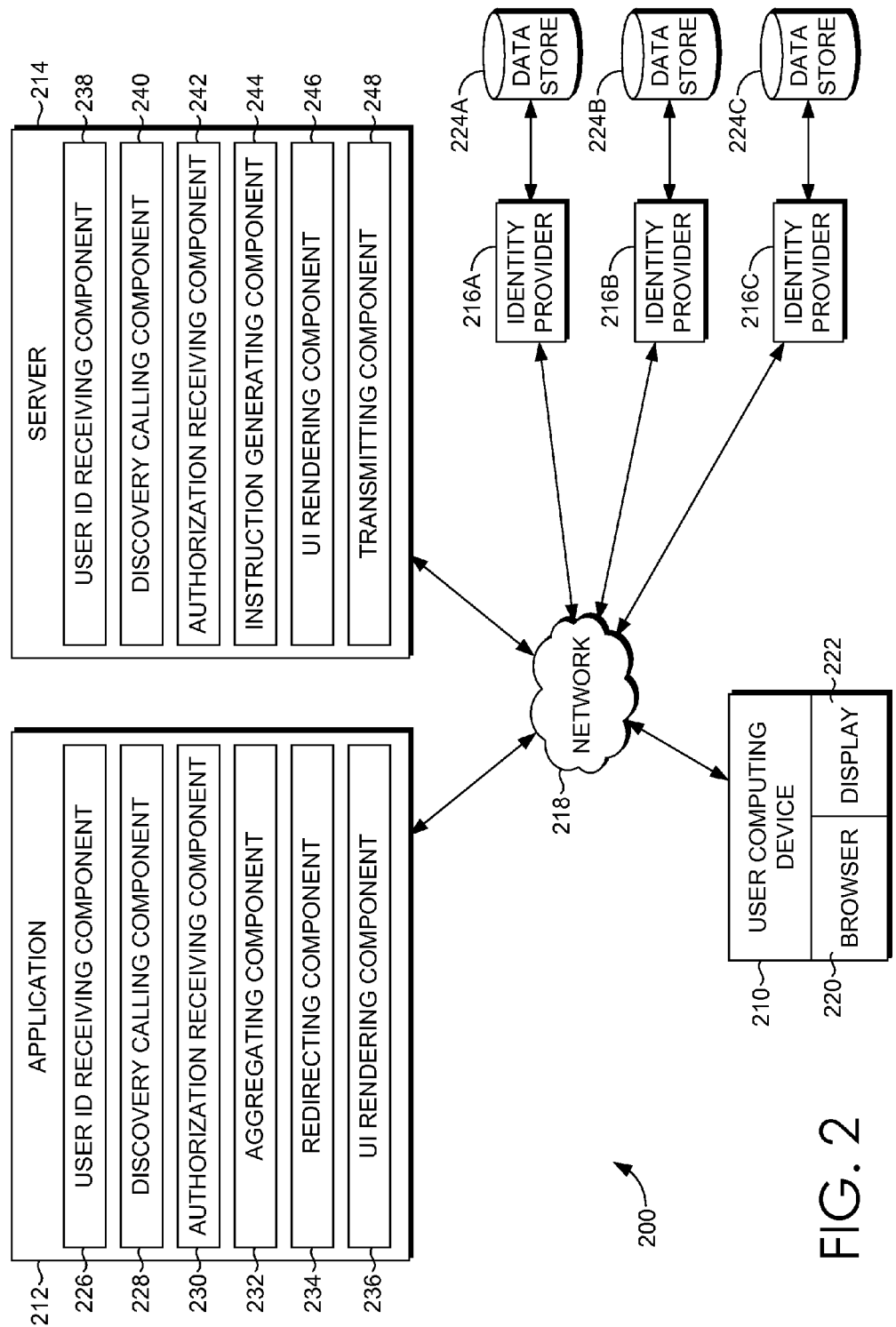
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which users may be authenticated to online applications or services. Among other components not shown, the computing system 200 generally includes a user computing device 210, an application or service to which authentication is required 212, a server 214, and a plurality of identity providers 216a, 216b, 216c, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of user computing devices 210, applications 212, and/or servers 214 may be employed in the computing system 200 within the scope of embodiments of the present invention. Each may comprise a single device/interface or multiple devices/interfaces cooperating in a distributed environment. For instance, the server 214 may comprise multiple devices and/or modules arranged in a distributed environment that collectively provide the functionality of the server 214 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the application 212, the server 214, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located in association with any number of applications 212, servers 214, or user computing devices 210. By way of example only, the application 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 220 and a display 222. The browser 220, among other things, is configured to render displays for receiving user authentication parameters in association with the display 222 of the user computing device 210. The browser 220 is further configured to receive user input of requests for various web pages (including website and application home pages), receive user input authentication parameters (generally input via a user interface presented on the display 222 and permitting alpha-numeric and/or textual input into a designated search input region) and to receive content for presentation on the display 222, for instance, from the application 212 and/or the server 214. It should be noted that the functionality described herein as being performed by the browser 220 may be performed by any other application, application software, user interface, or the like capable of rendering Web content. It should further be noted that embodiments of the present invention are equally applicable to mobile computing devices and devices accepting touch and/or voice input. Any and all such variations, and any combination thereof, are contemplated to be within the scope of embodiments of the present invention.

The application 212 of FIG. 2 is configured to, among other things, receive requests for user authentication, for instance, from the user computing device 210, and provide user interfaces in response thereto. The application 212 is additionally configured to, among other things, place API calls to one or more servers (e.g., server 214) and/or external identity providers (e.g., identity providers 216*a*, 216*b*, 216*c*) to aid in determining appropriate user interfaces to render. As illustrated, the application 212 includes a user identifier receiving component 226, a discovery calling component 228, an authentication information receiving component 230, an identity provider aggregating component 232, a redirecting component 234, a user interface rendering component 236, and a transmitting component 237.

The user identifier receiving component 226 is configured to receive a single user identifier. The received user identifier may be, for instance, an email address, a user name, a telephone number, or next generation credentials such as a USB key or a user agent built into an operating system, which may contain multiple identities or identifiers. In embodiments, a user identifier may be received in response to a user interface (for instance, presented in association with the display 222 of the user computing device 210) prompting the user for input of the user identifier. Such a user interface is illustrated in the exemplary screen display 300 of FIG. 3. Upon receiving a request from a user to access an application or service for which authentication is required (e.g., the application 212), the application or service may present the exemplary screen display 300 prompting the user to input a user identifier into a user identifier input field 310. Upon inputting the appropriate user identifier, the user is prompted to select the "Continue" button 312 which transmits the user identifier to the application wherein the user identifier is received by the user identifier receiving component 226.

In other embodiments (not shown), the user identifier may be received via a call from an external application that includes the user identifier. For instance, presume an invitation to view a particular file is received by a user of the user computing device 210 in an email account associated with a particular email address. Upon the user selecting to view the particular file, the email address may be transmitted to the application 212 necessary for viewing the file as a user identifier (where it is received by the user identifier receiving component 226) for streamlining authentication of the user to view the file.

The discovery calling component 228 is configured to place one or more API calls to perform discovery on a received user identifier against a plurality of identity providers (e.g., the identity providers 216*a*, 216*b*, 216*c*) to determine if any of the identity providers 216*a*, 216*b*, and 216*c* has an identity profile that matches the user identifier. An identity profile may be determined to match the user identifier if the user identifier is included in the identity profile. In embodiments, an identity profile may be determined to match the user identifier even if the user identifier is not actually included in any user profile, for instance, where the system uses knowledge that a particular identity provider is authoritative for a particular domain, telephone number, or the like. By way of example only and not limitation, if the user identifier is an email address (e.g., kelly@contoso.com), an identity profile may be determined to match the user identifier if (a) it is determined that the associated identity provider has a user profile that includes the email address, (b) it is determined that the associated identity provider has a user profile that includes a subset of the email address, or (c) it is determined that the associated identity provider is configured for the domain of the email address (that is, that the associated identity provider is known to manage users associated with the domain of the email address (e.g., Contoso). As another example, and not by way of limitation, if the user identifier is a telephone number, an identity profile may be determined to match the user identifier if (a) it is determined that the associated identity provider has a user profile that includes the phone number, (b) it is determined that the associated identity provider has a user profile that includes a subset of the phone number, such as the country code, or (c) it is determined that the associated identity provider is authoritative for the telephone number, for example, by querying a Number Lookup Service or a carrier's Home Location Register, in order to determine the current network of the specified telephone number. Performing discovery against less than an entire user identifier (e.g., against a domain, country code, carrier, or the like) provides system optimizations as it permits caching of smaller subsets of information on a front-end server and may require discovery only against such cached information, providing efficiency in providing a response. Any and all such variations, and any combination thereof, are contemplated to be within the scope of embodiments of the present invention.

In embodiments, the discovery calling component 228 may place multiple API calls in parallel, synchronously or asynchronously, to the various identity providers 216a, 216b, and 216c. Each identity provider to which a call is placed may then access one or more associated data stores (e.g., data stores 224a, 224b, 224c, respectively) to determine whether it has an identity profile that matches the user identifier associated therewith. A response including a determination of whether or not each respective identity provider has an identity profile matching the user identifier may then be returned to the application 212. It will be understood by those of ordinary skill in the art that the lack of a response without an associated error message may be interpreted as receipt of a response indicating the particular identity provider does not have an identity profile matching the user identifier. Upon receipt of the identity provider responses, the aggregating component 232 may aggregate the received responses to determine which identity providers, if any, have an identity profile matching the user identifier.

In other embodiments, a single API call may be placed to a back-end server (e.g., server 214) and a single response may be received, e.g., by authentication information receiving component 230, that includes authentication information already aggregated from the plurality of identity providers. Any and all such variations, and any combination thereof, are contemplated to be within the scope of embodiments of the present invention.

If only a single identity provider of the plurality of identity providers 216a, 216b, and 216c has authentication information associated with the user identifier, the redirecting component 234 of the application 212 may redirect the user for authentication against the single identity provider. In embodiments, after redirection, a user interface may be rendered, e.g., via the user interface rendering component 236, and transmitted to the user computing device 210 (e.g., via the transmitting component 237) prompting the user to input what she thinks of as additional authentication credentials associated with the single user identifier. Such a user interface is illustrated in the exemplary screen display 400 of FIG. 4. Presume that in response to the exemplary screen display 300 of FIG. 3, the user entered the user identifier "bob@contoso.com." If it is determined that only a single identity provider has a user profile matching the input user identifier, the screen display 400 of FIG. 4 may be presented with the user identifier input box 410 pre-populated with the input user identifier. The screen display may also include an additional credential input field (i.e., password input field 412) and a selectable button 414 for signing into the appropriate identity provider.

Figure 5:
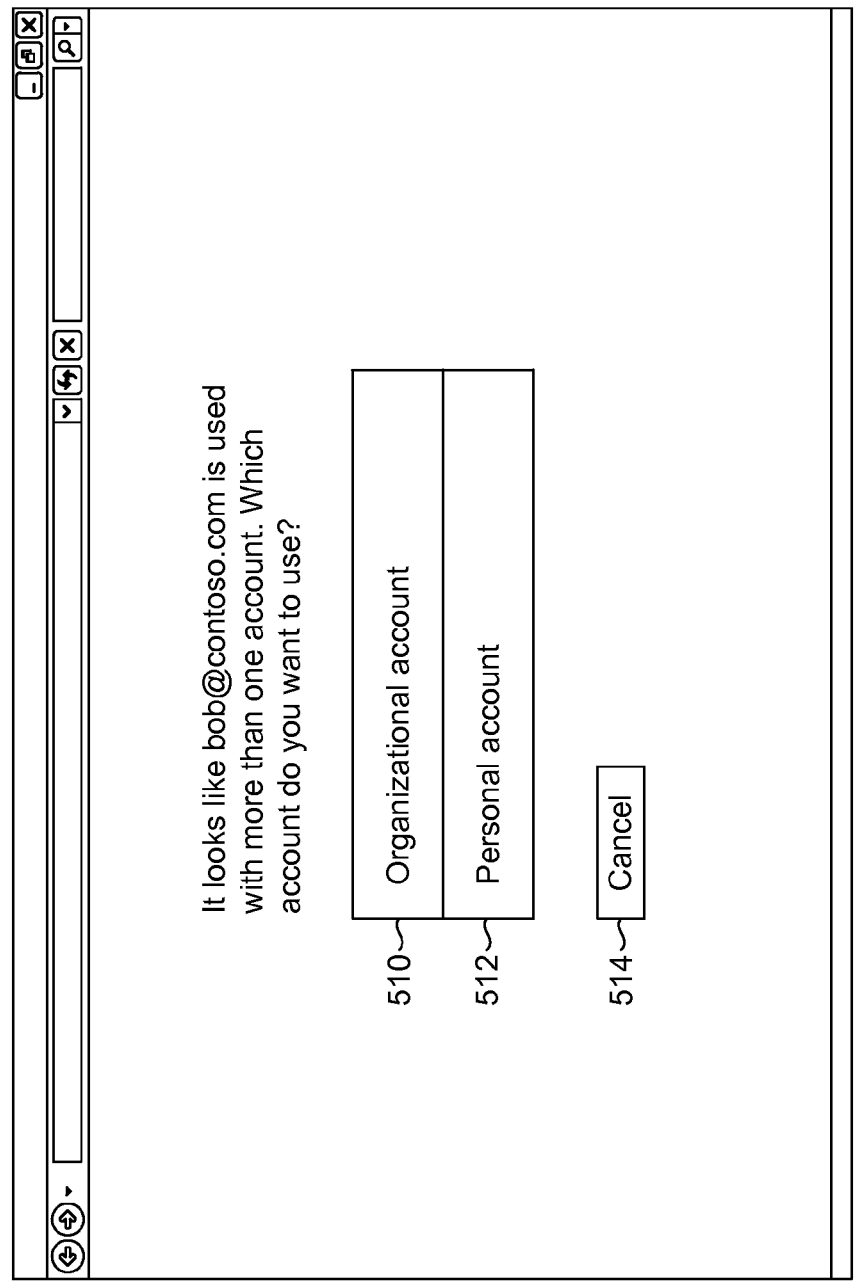
FIG. 5 is an exemplary screen display for permitting a user to select a desired identity provider where multiple identity providers are determined to have a user profile matching a received user identifier, in accordance with an embodiment of the present invention.

If instead it is determined that multiple identity providers of the plurality of identity providers 216a, 216b, 216c have authentication information associated with the user identifier, a first disambiguation user interface may be rendered utilizing user interface rendering component 236, and the disambiguation user interface transmitted to the user computing device 210 via the transmitting component 237. In embodiments, the first disambiguation user interface may include identifying information corresponding only to those identity providers that are determined to have a user profile that matches the user identifier. That is, identifying information for any identity provider of the plurality that does not have a user profile matching the received user identifier may not be rendered in association with the first disambiguation user interface. FIG. 5 shows exemplary screen display of an illustrative first disambiguation user interface 500.

Figure 3:
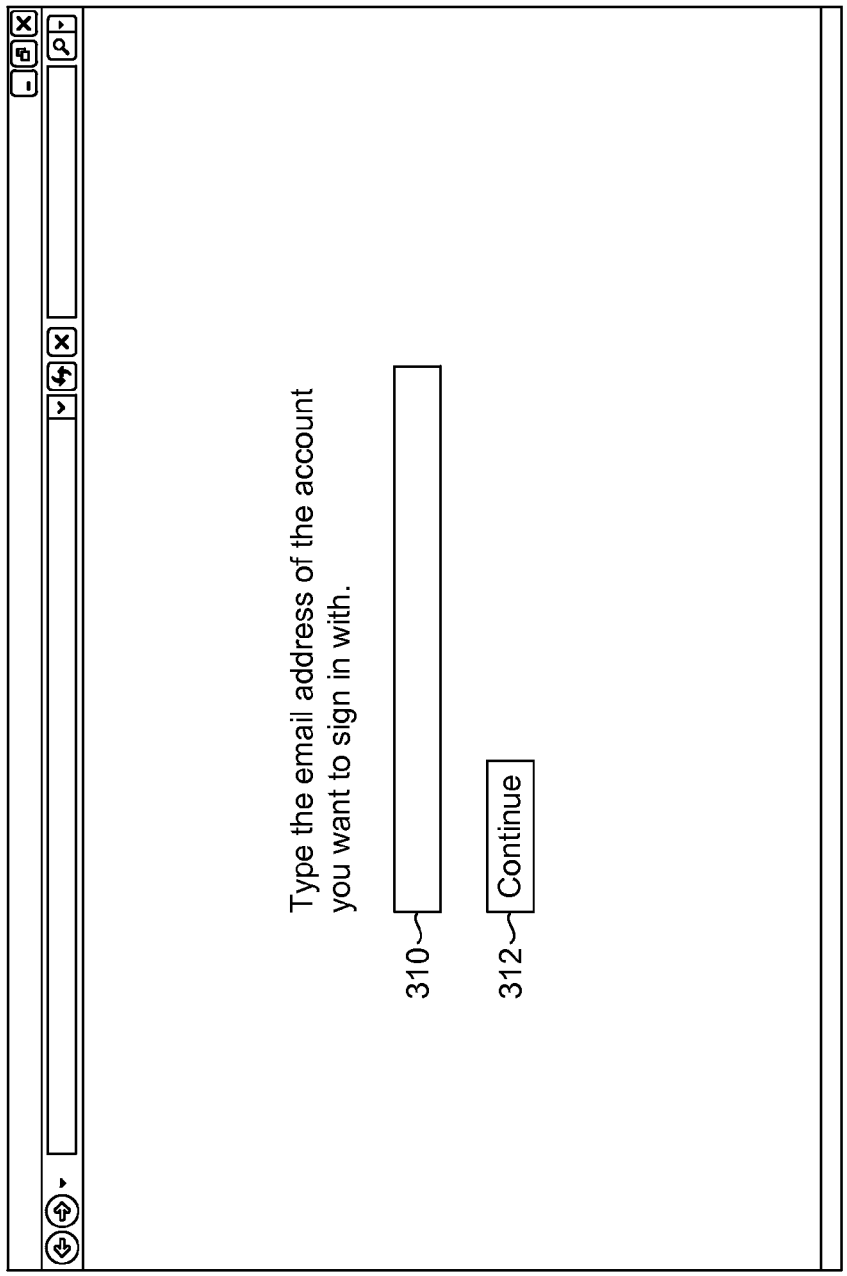
FIG. 3 is an exemplary screen display for receiving a user identifier, in accordance with an embodiment of the present invention.
Figure 4:
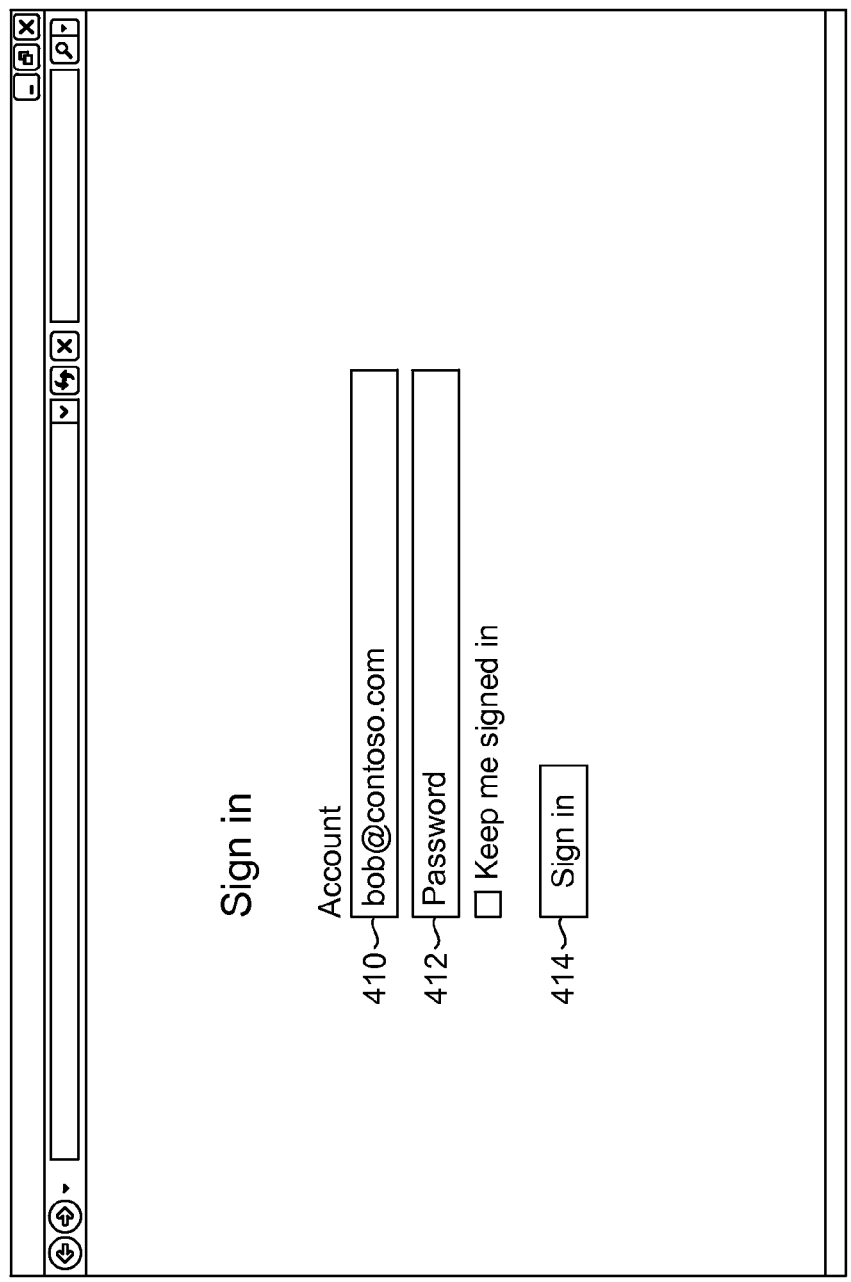
FIG. 4 is an exemplary screen display wherein a single identity provider has been determined to have a user profile matching a received user identifier, in accordance with an embodiment of the present invention.

Again presume that in response to the exemplary screen display 300 of FIG. 3, the user entered the user identifier "bob@contoso.com" If it is determined that multiple identity providers have a user profile matching the input user identifier, the disambiguation user interface 500 of FIG. 5 may be presented. The disambiguation user interface 500 prompts the user to select which of the multiple identity providers he or she would like to use and includes three selectable buttons. The first 510 indicates that the user identifier is maintained in a user profile associated with an organizational account assigned by the user's work or school. The second 512 indicates that the user identifier is maintained in a user profile associated with a personal account of the user. The third button 514 allows the user to cancel the action.

Figure 6:
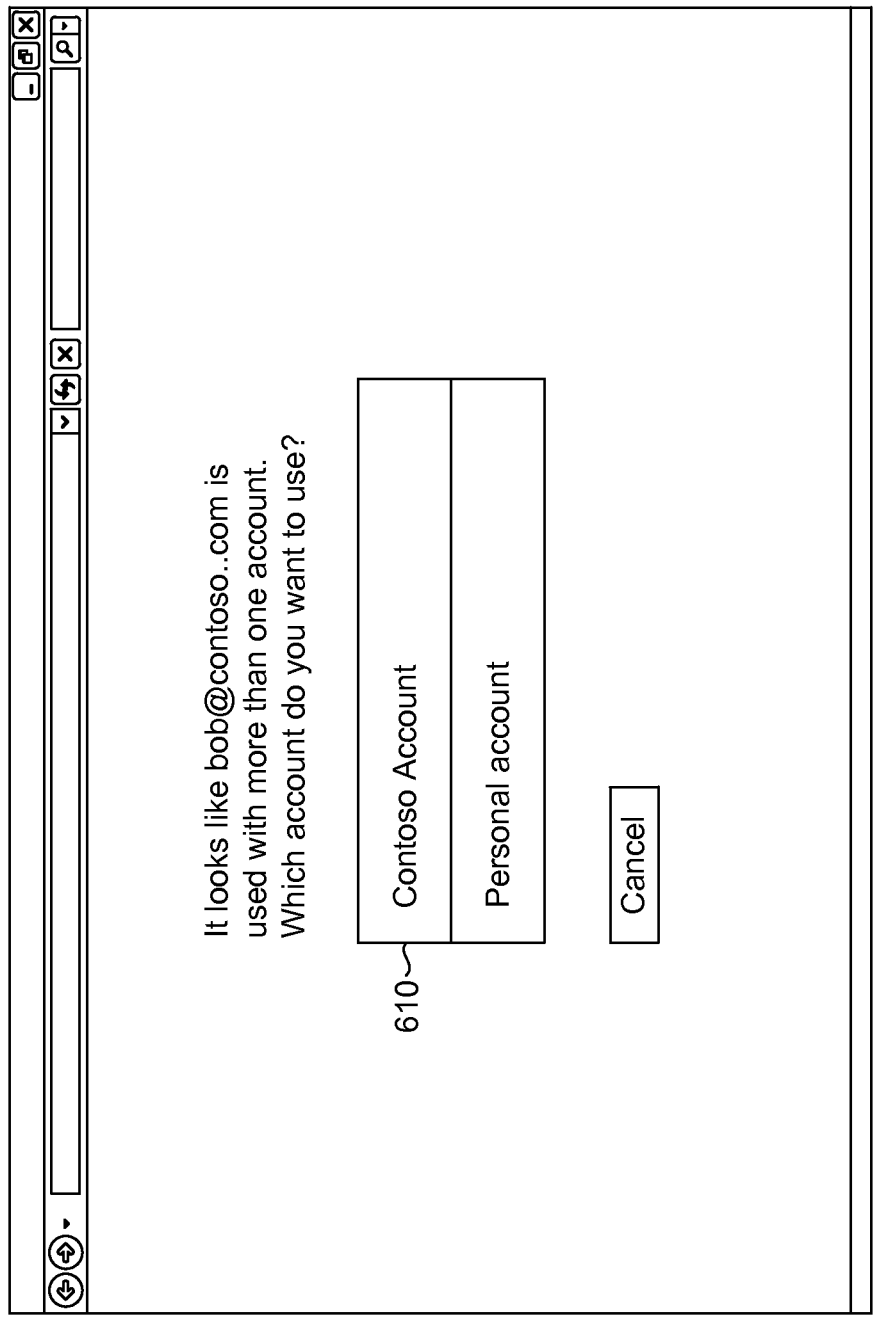
FIG. 6 is an exemplary screen display of a first disambiguation user interface for permitting a user to select a desired identity provider where multiple identity providers are determined to have a user profile matching a received user identifier, wherein one of the identity providers is identified by the name of the organization owning the received user identifier rather than the identity provider, in accordance with an embodiment of the present invention.

In embodiments, if one or more of the multiple identity providers determined to have a user profile that matches the user identifier is determined to be an organization owning the user identifier, the application may render a disambiguation user interface having identifying information for the organization instead of, or in addition to, the identity provider to improve the ease with which the user may be able to correctly determine the desired identity provider. FIG. 6 shows an exemplary screen display of such an illustrative disambiguation user interface 600. As can be seen, the first selectable button 610 indicates that the user identifier is maintained in a user profile associated with an identity provider utilized by Contoso for its users. The identity provider itself is not identified but rather the organization owning the user identifier, making it easier for the user to identify the correct desired account.

Figure 7:
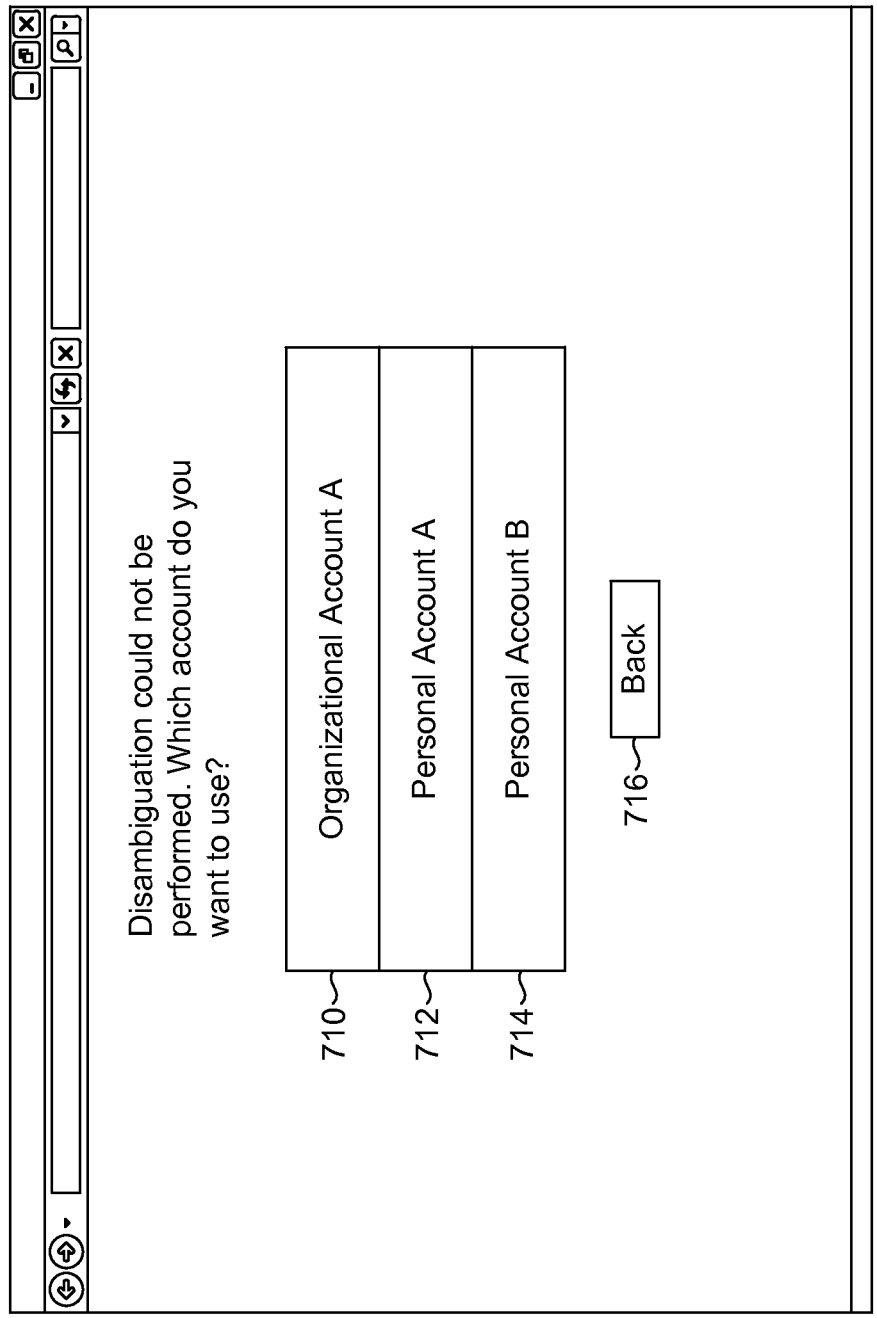
FIG. 7 is an exemplary screen display of a second disambiguation user interface for permitting a user to select from a plurality of identity providers when disambiguation cannot be performed, in accordance with an embodiment of the present invention.

If upon the discovery calling component 228 placing the one or more API calls to perform discovery on the user identifier against the plurality of identity providers 216a, 216b, 216c, at least one of the API calls times out or returns unexpected, invalid, or throttled results, the user interface rendering component 236 is configured to render a second disambiguation user interface. In embodiments, the second disambiguation user interface may include names, pictograms and/or user-selectable buttons, each button representing an identity provider, such that the user may be permitted to aid in selection of the desired identity provider. Such an exemplary screen display is shown in the second disambiguation user interface 700 of FIG. 7. As illustrated, the user is informed that disambiguation could not be performed and the user is simply asked to select an identity provider 710, 712 or 714 he wishes to authenticate against. Pressing the selectable button 716 labeled "Back" returns the user to the previous screen (e.g., FIG. 3), allowing the user to enter a different user identifier.

If upon placing the one or more API calls to perform discovery on the user identifier against the plurality of identity providers it is determined that no identity providers of the plurality have a user profile that matches the user identifier, the user interface rendering component 236 is further configured to render a user interface to allow the user to create an account with one or more identity providers or input a different user identifier. In embodiments, the account creation or retry user interface may allow the user to create an identity profile with one or more of the plurality of identity providers that is determined to be most appropriate for the user identifier. For instance, heuristics may be utilized to determine whether the user identifier is likely company issued or personal. Such an exemplary user interface 800 is shown in the illustrative screen display of FIG. 8. As illustrated, it has been determined that an organizational account is likely most appropriate for the user, based upon the Internet domain of the "bob@contoso.com" user identifier, and, accordingly, the user is presented with a user interface for creating a Contoso account with the appropriate identity provider. The input user identifier is pre-populated in the user identifier input field 810 and the user is asked to create a password in an additional authentication credentials input field 812. Once the password is created, the user may select the "Create" button 814 and an account may be created. Pressing the selectable button 816 labeled "Back" returns the user to the previous screen (e.g., FIG. 3), allowing the user to enter a different user identifier. In embodiments (not shown), account creation or retry options may be rendered in conjunction with identifying information for identity providers determined to have user profiles matching the user identifier as well.

The server 214 of FIG. 2 is configured to, among other things, receive requests for user authentication (e.g., from an application) and provide instructions for rendering appropriate user interfaces in response thereto. The server 214 is additionally configured to provide aggregated identity provider authentication information in the form of a digest, for instance, to an application (e.g., the application 212) permitting the application to determine the appropriate user interface to render. As illustrated, the server 124 includes a user identifier receiving component 238, a discovery calling component 240, an authentication information receiving component 242, an instruction generating component 244, a user interface rendering component 246, and a transmitting component 248.

The user identifier receiving component 238 is configured to receive a single user identifier. The received user identifier may be, for instance, an email address, a user name, a telephone number, or next generation credentials such as a USB key or a user agent built into an operating system, which may contain multiple identities or identifiers. In embodiments, the user identifier is received by the user identifier receiving component 238 from an application, e.g., the application 212, for which user authentication is desired.

As previously set forth, in embodiments, the discovery calling component 228 of the application 212 may place a single API call may be placed to the server 214 and a single response may be returned to the application 212 that includes authentication information already aggregated from the plurality of identity providers. Thus, the discovery calling component 240 of the server 212 is configured to place one or more API calls to perform discovery on a user identifier received from the application 212 (e.g., by the user identifier receiving component 238) against a plurality of identity providers (e.g., the identity providers 216a, 216b, 216c) to determine if any of the identity providers 216a, 216b, 216c have an identity profile that matches the user identifier. In embodiments, the discovery calling component 240 may place multiple API calls in parallel, synchronously or asynchronously, to the various identity providers 216a, 216b, and 216c. Each identity provider to which a call is placed may then access one or more associated data stores (e.g., data stores 224a, 224b, 224c, respectively) to determine whether it has an identity profile that matches the user identifier associated therewith. A response including a determination of whether or not each respective identity provider has an identity profile matching the user identifier may then be returned to the authentication information receiving component 242. It will be understood by those of ordinary skill in the art that the lack of a response without an associated error message may be interpreted as receipt of a response indicating the particular identity provider does not have an identity profile matching the user identifier. Upon receipt of the identity provider responses, the received responses may be aggregated to determine which identity providers, if any, have an identity profile matching the user identifier.

If only a single identity provider of the plurality of identity providers 216a, 216b, 216c has authentication information associated with the user identifier, the instruction generating component 244 is configured to generate instructions for the application 212 to render a user interface for redirecting the user for authentication against the single identity provider and the transmitting component 248 is configured to transmit such instructions to the application 212. If instead it is determined that multiple identity providers of the plurality of identity providers 216a, 216b, 216c have authentication information associated with the user identifier, the instruction generating component 244 is configured to generate instructions for the application 212 to render a first disambiguation user interface and the transmitting component 248 is configured to transmit such instructions to the application 212. As previously described, in embodiments, the first disambiguation user interface may include identifying information corresponding only to those identity providers that are determined to have a user profile that matches the user identifier. That is, identifying information for any identity provider of the plurality that does not have a user profile matching the received user identifier may not be rendered in association with the first disambiguation user interface.

If upon the discovery calling component 240 placing the one or more API calls to perform discovery on the user identifier against the plurality of identity providers 216a, 216b, 216c, at least one of the API calls times out or returns unexpected, invalid, or throttled results, the instruction generating component 244 is configured to instruct the application 212 to render a second disambiguation user interface and the transmitting component 248 is configured to transmit such instructions to the application 212. As previously described, in embodiments, the second disambiguation user interface may include names, pictograms and/or user-selectable buttons, each button representing an identity provider, such that the user may be permitted to aid in selection of the desired identity provider.

If upon the discovery calling component 240 placing the one or more API calls to perform discovery on the user identifier against the plurality of identity providers 216a, 216b, 216c it is determined that no identity providers of the plurality have a user profile that matches the user identifier, the instruction generating component 244 is configured to instruct the application 212 to render an account creation user interface to allow the user to create an identity profile with one or more identity providers, the transmitting component 248 being configured to transmit such instructions to the application 212. In embodiments, the account creation user interface may allow the user to create an identity profile with one or more of the plurality of identity providers that is determined to be most appropriate for the user identifier. For instance, heuristics may be utilized to determine whether the user identifier is likely company issued or personal.

In embodiments, instead of the instruction generating component 244 generating instructions for the application 212 to render a user interface appropriate for the response received from the identity providers 216a, 216b, 216c, the user interface rendering component 246 may be configured to determine the user experience to be rendered. Such an embodiment permits a service maintaining the server to add more identity providers over time and/or selectively return only those identity providers having namespaces that collide in the disambiguation screen. Instructions for rendering the server-determined user interface may then be transmitted to the application 212, for instance, utilizing the transmitting component 248.

Figure 9:
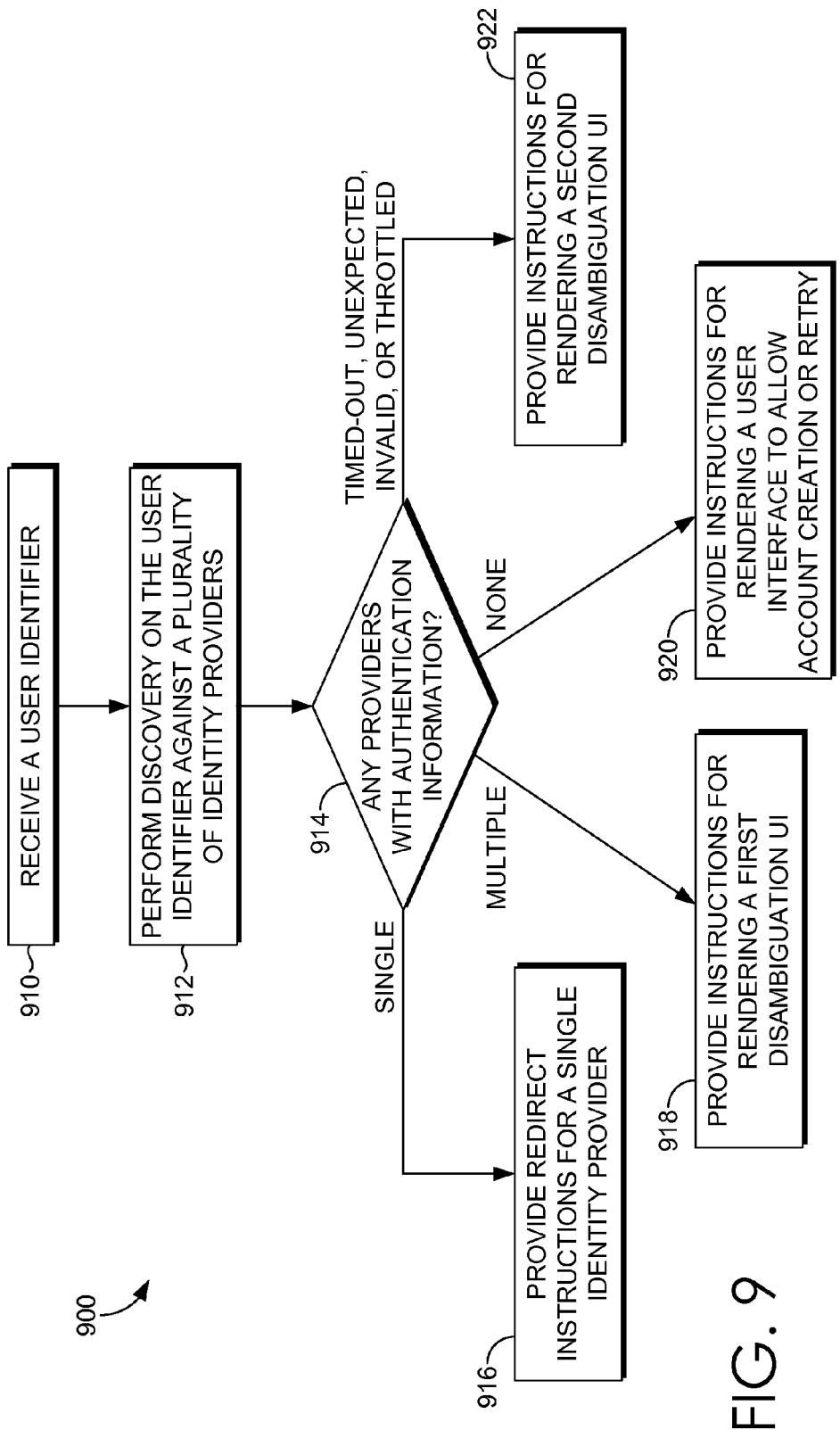
FIG. 9 is a flow diagram showing an exemplary method for discovery and disambiguation of identity providers, in accordance with an embodiment of the present invention.

Turning now to FIG. 9, a flow diagram is illustrated showing an exemplary method 900 for authenticating a user to an online application or service, in accordance with an embodiment of the present invention. As indicated at block 910, a single user identifier (e.g., an email address, a user name, a telephone number, or next generation credentials such as a USB key or a user agent built into an operating system, which may contain multiple identities or identifier) is received. As indicated at block 912, upon receipt of a user identifier, one or more API calls are performed on the user identifier against a plurality of identity providers. At block 914, it is determined if any identity providers of the plurality of identity providers has a user profile that matches the user identifier. If it is determined that a single identity provider of the plurality has a user profile that matches the user identifier, instructions for generating a redirection user interface for authenticating against the single identity provider are provided, as indicated at block 916. If, however, if it is determined at block 914 that multiple identity providers of the plurality of identity providers have a user profile that matches the user identifier, instructions for rendering a first disambiguation user interface are provided, as indicated at block 918. Characteristics of exemplary first disambiguation user interfaces have been described herein above.

If it is determined at block 914 that no identity provider of the plurality has a user profile that matches the user identifier, instructions for rendering a user interface to allow account creation or input of a different user identifier are provided, as indicated at block 920. Characteristics of exemplary account creation or retry user interfaces are described herein above. If at least one of the API calls times out or returns unexpected, invalid, or throttled results, instructions for rendering a second disambiguation user interface are provided for seeking user assistance in determining which identity provider is desired. This is indicated at block 922. Characteristics of exemplary second disambiguation user interfaces are described herein above.

Figure 10:
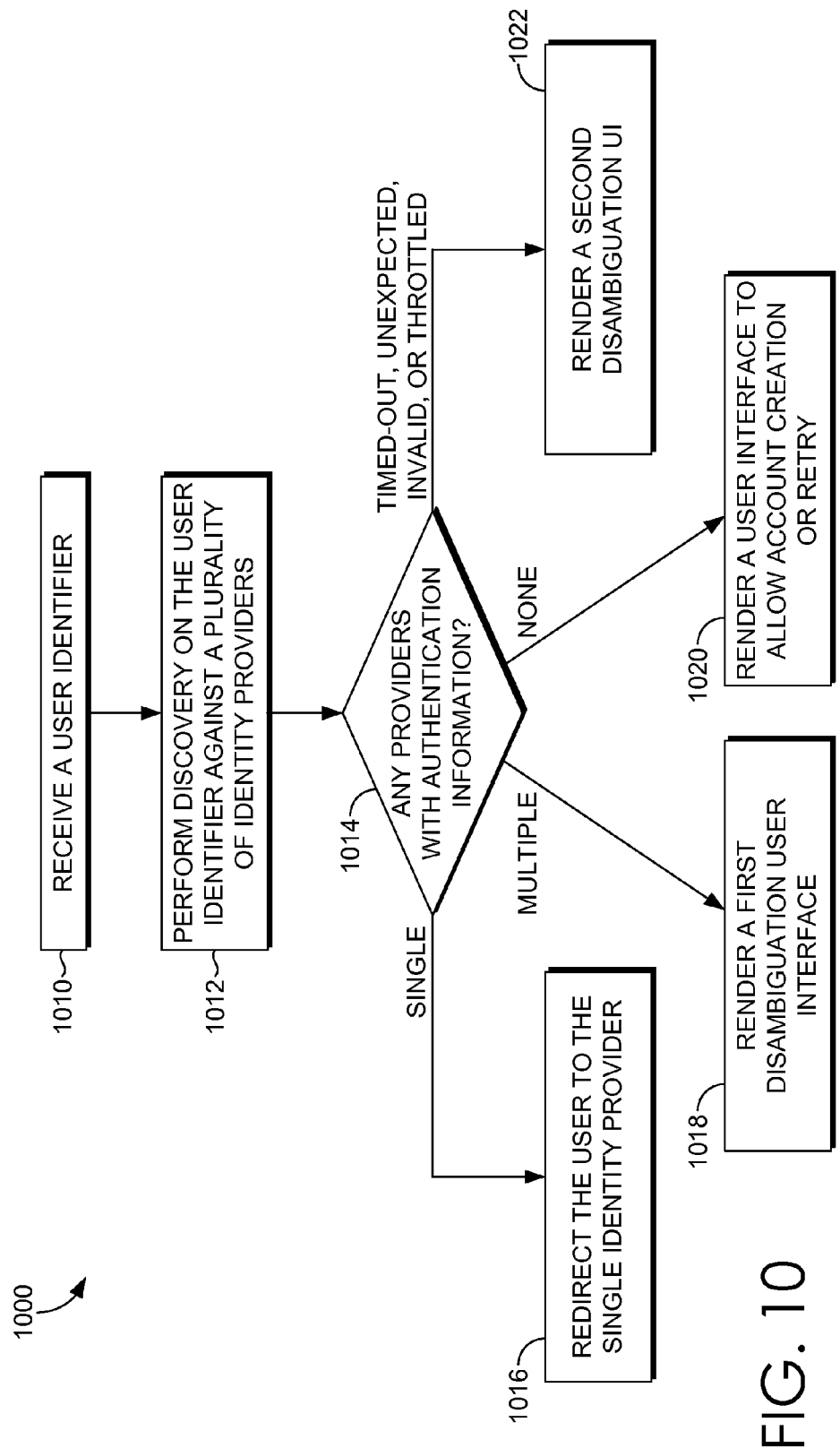
FIG. 10 is a flow diagram showing another exemplary method discovery and disambiguation of identity providers, in accordance with an embodiment of the present invention.

With reference to FIG. 10, a flow diagram a flow diagram is illustrated showing an exemplary method 1000 for authenticating a user to an online application or service, in accordance with an embodiment of the present invention. As indicated at block 1010, a single user identifier (e.g., an email address, a user name, a telephone number, or next generation credentials such as a USB key or a user agent built into an operating system, which may contain multiple identities or identifier) is received. As indicated at block 1012, upon receipt of a user identifier, one or more API calls are performed on the user identifier against a plurality of identity providers. At block 1014, it is determined if any identity providers of the plurality of identity providers have a user profile that matches the user identifier. If it is determined that a single identity provider of the plurality has a user profile that matches the user identifier, a redirection user interface is generated for authenticating against the single identity provider, as indicated at block 1016. If, however, if it is determined at block 1014 that multiple identity providers of the plurality of identity providers have a user profile that matches the user identifier, a first disambiguation user interface is generated, as indicated at block 1018. Characteristics of exemplary first disambiguation user interfaces have been described herein above.

If it is determined at block 1014 that no identity provider of the plurality has a user profile that matches the user identifier, a user interface is rendered to allow account creation or input of a different user identifier, as indicated at block 1020. Characteristics of exemplary account creation or retry user interfaces are described herein above. If at least one of the API calls times out or returns unexpected, invalid, or throttled results, a second disambiguation user interface is rendered for seeking user assistance in determining which identity provider is desired. This is indicated at block 1022. Characteristics of exemplary second disambiguation user interfaces are described herein above.

As can be understood, embodiments of the present invention provide systems, methods, and computer-readable storage media for, among other things, discovering and disambiguating identity providers in such a way that necessary user knowledge pertaining to appropriate identity providers is minimized, if not eliminated, as users are presented with options for selecting appropriate providers only when multiple providers have a user profile that matches a particular user identifier. Further, when users are presented with options for selecting appropriate providers, various providers that have a user profile that matches a particular user identifier are presented to the user utilizing identity information pertaining to the organization that utilizes a particular identity provider for its users rather than exclusively by identifying information for the identity provider—which the user may not even be aware is performing the identity management for the organization owning their user identifier. Still further, where it is determined that no identity provider has a user profile associated with a particular user identifier (or where it is determined that an identity provider that does not have a user profile associated with a particular user identifier would generally be appropriate to be utilized with the user identifier, for instance, based upon an Internet domain associated with the user identifier), systems and methods hereof provide the opportunity for users to create an account with one or more identity providers or to retry with a different user identifier.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 900 of FIGS. 9 and 1000 of FIG. 10 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to:
   receive a first user identifier;
   place one or more Application Programming Interface (API) calls to perform discovery on the first user identifier against a plurality of identity providers to determine whether any of the plurality of identity providers has an identity profile that matches the first user identifier;
   based at least on a determination that a single identity provider of the plurality has a user profile that matches the first user identifier, provide redirect instructions for authenticating against the single identity provider;
   based at least on a determination that multiple identity providers of the plurality have a user profile that matches the first user identifier, provide instructions for rendering a first disambiguation user interface;
   based at least on a determination that disambiguation is unable to be performed, provide instructions for rendering a second disambiguation user interface; and
   based at least on a determination that no identity provider of the plurality has a user profile that matches the first user identifier, provide instructions for rendering at least one of an account creation interface and an interface permitting input of a second user identifier.

2. The one or more computer readable storage media of claim 1, wherein the first user identifier is one of an email address, a user name, and a telephone number.

3. The one or more computer-readable storage media of claim 1, wherein the one or more computing devices provide instructions for rendering the first disambiguation user interface by providing instructions for rendering identifying information corresponding only to the multiple identity providers of the plurality that are determined to have a user profile that matches the user identifier.

4. The one or more computer-readable storage media of claim 3, wherein the identifying information corresponding to at least one of the multiple identity providers of the plurality that are determined to have a user profile that matches the first user identifier matches information identifying an organizational owner of the first user identifier.

5. The one or more computer-readable storage media of claim 1, wherein the one or more computing devices provide instructions for rendering the first disambiguation user interface by providing instructions for rendering identifying information corresponding to the multiple identity providers of the plurality that are determined to have a user profile that matches the user identifier and identifying information corresponding to at least one identity provider of the plurality that is determined not to have a user profile that matches the user identifier, and wherein the one or more computing devices further provide instructions for rendering the first disambiguation user interface to allow for creating an identity profile with the at least one identity provider that is determined not to have a user profile that matches the user identifier.

6. The one or more computer-readable storage media of claim 1, wherein the one or more computing devices provide instructions for rendering the first disambiguation user interface by providing instructions for rendering the first disambiguation user interface to allow for user selection of one of the multiple identity providers.

7. The one or more computer-readable storage media of claim 6, wherein the one or more computing devices further determine that the user identifier is organizationally owned, and wherein the one or more computing devices provide instructions for rendering the first disambiguation user interface by, at least in part, providing instructions for rendering identifying information for one of the multiple identity providers that includes information associated with the organization owning the user identifier.

8. The one or more computer-readable storage media of claim 1, wherein the one or more computing devices provide instructions for rendering an account creation user interface by providing instructions for rendering the account creation user interface to allow for creating an identity profile with an identity provider of the plurality that is determined to be most appropriate for the user identifier.

9. The one or more computer-readable storage media of claim 1, wherein the one or more computing devices receive a single user identifier by receiving an email address, the email address having a domain, and wherein the one or more computing devices further comprises:
   determine that a particular identity provider of the plurality of identity providers is configured for the domain; and
   provide instructions for rendering identifying information corresponding to the particular identity provider.

10. The one or more computer-readable storage media of claim 1, wherein it is determined that disambiguation is unable to be performed when one or more API calls times out or returns unexpected, invalid, or throttled results.

11. A method being performed by one or more computing devices including at least one processor, comprising:
   receiving a first user identifier;
   placing one or more Application Programming Interface (API) calls to perform discovery on the first user identifier against a plurality of identity providers to determine whether any of the plurality of identity providers has authentication information associated with the first user identifier;
   based at least on a determination that a single identity provider of the plurality of identity providers has authentication information associated with the first user identifier, redirecting the user for authentication against the single identity provider;
   based at least on a determination that multiple identity providers of the plurality of identity providers have authentication information associated with the first user identifier, rendering a first disambiguation user interface;
   based at least on a determination that disambiguation is unable to be performed, rendering a second disambiguation user interface; and
   based at least on a determination that no identity provider of the plurality of identity providers have authentication information associated with the first user identifier, rendering at least one of an account creation interface and an interface permitting input of a second user identifier.

12. The method of claim 11, wherein rendering the first disambiguation user interface comprises rendering the first disambiguation user interface with identifying information corresponding only to the multiple identity providers of the plurality of identity providers that are determined to have authentication information associated with the first user identifier.

13. The method of claim 12, wherein the identifying information corresponding to at least one of the multiple providers of the plurality of identity providers that are determined to have authentication information associated with the first user identifier includes information identifying an organizational owner of the first user identifier.

14. The method of claim 11, wherein rendering the first disambiguation user interface comprises rendering the first disambiguation user interface to allow for user selection of one of the multiple identity providers.

15. The method of claim 11, further comprising determining that the first user identifier is organizationally owned, and wherein rendering the first disambiguation user interface includes rendering identifying information for one of the multiple identity providers that includes information associated with the organization owning the first user identifier.

16. The method of claim 11, wherein rendering an account creation user interface comprises rendering the account creation user interface to allow for creating an identity profile with an identity provider of the plurality that is determined to be most appropriate for the first user identifier.

17. The method of claim 11, wherein receiving the first user identifier comprises one of prompting for input of the first user identifier and receiving a call from an external application that includes the first user identifier.

18. The method of claim 11, wherein placing one or more API calls to perform discovery on the first user identifier against the plurality of identity providers to determine if any identity providers of the plurality has authentication information associated with the first user identifier comprises:
performing multiple API calls in parallel;
receiving a response from each API call performed; and
aggregating the responses received to determine if there are any identity providers of the plurality of identity providers that have a user profile that matches the first user identifier.

19. The method of claim 11, wherein placing one or more API calls to perform discovery on the first user identifier against the plurality of identity providers to determine if any identity providers of the plurality has authentication information associated with the first user identifier comprises:
performing a single API call; and
receiving a single response including information aggregated from the plurality of identity providers.

20. The method of claim 11, wherein it is determined that disambiguation is unable to be performed when one or more API calls times out or returns unexpected, invalid, or throttled results.

21. A system comprising:
a server having one or more processors and one or more computer-readable storage media; and
at least one data store coupled with the server,
the server configured to:
receive a request for access to an application or service for which authentication is required;
provide a first user interface that allows for selection from a first plurality of identity providers or identity provider types for authenticating to the application or service, wherein the first user interface further allows for selection of an option for seeking assistance in selecting one of the first plurality of identity providers or identity provider types;
receive a selection of the option for seeking assistance in selecting one of the first plurality of identity providers or identity provider types;
provide a second user interface prompting for input of a single user identifier; and
place one or more Application Programming Interface (API) calls to perform discovery on the user identifier against a second plurality of identity providers to determine if any identity providers of the second plurality have an identity profile that matches the user identifier.

22. The system of claim 21, wherein:
based at least on a determination that a single identity provider of the second plurality of identity providers has authentication information associated with the user identifier, the server is further configured to redirect the user for authentication against the single identity provider;
based at least on the determination that multiple identity providers of the second plurality of identity providers have authentication information associated with the user identifier, the server is further configured to render a first disambiguation user interface;
based at least on a determination that disambiguation is unable to be performed, the server is further configured to render a second disambiguation user interface; and
based at least on a determination that no identity provider of the second plurality of identity providers has authentication information associated with the user identifier, the server is further configured to render at least one of an account creation interface and an interface permitting input of a different user identifier.

23. The system of claim 21, wherein the server is further configured to determine that disambiguation is unable to be performed when one or more API calls times out or returns unexpected, invalid, or throttled results.

24. A system comprising:
a server having one or more processors and one or more computer-readable storage media; and
at least one data store coupled with the server,
wherein the server:
receives a first user identifier;
places one or more Application Programming Interface (API) calls to perform discovery on the first user identifier against a plurality of identity providers to determine whether any of the plurality of identity providers has an identity profile that matches the first user identifier;
based at least on a determination that a single identity provider of the plurality has a user profile that matches the first user identifier, provides redirect instructions for authenticating against the single identity provider;
based at least on a determination that multiple identity providers of the plurality have a user profile that matches the first user identifier, provides instructions for rendering a first disambiguation user interface;

based at least on a determination that disambiguation is unable to be performed, provides instructions for rendering a second disambiguation user interface; and based at least on a determination that no identity provider of the plurality has a user profile that matches the first user identifier, provides instructions for rendering at least one of an account creation interface and an interface permitting input of a second user identifier.

25. The system of claim 24, wherein the first user identifier is one of an email address, a user name, and a telephone number.

26. The system of claim 24, wherein the server provides instructions for rendering the first disambiguation user interface by providing instructions for rendering identifying information corresponding only to the multiple identity providers of the plurality that are determined to have a user profile that matches the user identifier.

27. The system of claim 26, wherein the identifying information corresponding to at least one of the multiple identity providers of the plurality that are determined to have a user profile that matches the first user identifier matches information identifying an organizational owner of the first user identifier.

28. The system of claim 24, wherein the server provides instructions for rendering the first disambiguation user interface by providing instructions for rendering identifying information corresponding to the multiple identity providers of the plurality that are determined to have a user profile that matches the user identifier and identifying information corresponding to at least one identity provider of the plurality that is determined not to have a user profile that matches the user identifier, and wherein the server further provides instructions for rendering the first disambiguation user interface to allow for creating an identity profile with the at least one identity provider that is determined not to have a user profile that matches the user identifier.

29. The system of claim 24, wherein the one or more computing devices provide instructions for rendering the first disambiguation user interface by providing instructions for rendering the first disambiguation user interface to allow for user selection of one of the multiple identity providers.

30. The system of claim 29, wherein the server further determines that the user identifier is organizationally owned, and wherein the server provides instructions for rendering the first disambiguation user interface by, at least in part, providing instructions for rendering identifying information for one of the multiple identity providers that includes information associated with the organization owning the user identifier.

31. The system of claim 24, wherein the server provides instructions for rendering an account creation user interface by providing instructions for rendering the account creation user interface to allow for creating an identity profile with an identity provider of the plurality that is determined to be most appropriate for the user identifier.

32. The system of claim 24, wherein the server receives a single user identifier by receiving an email address, the email address having a domain, and wherein the server further comprises:

determines that a particular identity provider of the plurality of identity providers is configured for the domain; and provides instructions for rendering identifying information corresponding to the particular identity provider.

33. The system of claim 24, wherein the server determines that disambiguation is unable to be performed when one or more API calls times out or returns unexpected, invalid, or throttled results.

\* \* \* \* \*